United States Patent
Hayes et al.

(10) Patent No.: US 6,932,382 B2
(45) Date of Patent: Aug. 23, 2005

(54) HALL EFFECT SENSOR ASSEMBLY

(75) Inventors: Earl James Hayes, South Lyon, MI (US); Raymond Bruce McLauchlan, McComb Township, MI (US)

(73) Assignee: FCI Americas Technology, Inc., Reno, NV (US)

( * ) Notice: Subject to any disclaimer, the term of this patent is extended or adjusted under 35 U.S.C. 154(b) by 70 days.

(21) Appl. No.: 10/696,242

(22) Filed: Oct. 29, 2003

(65) Prior Publication Data

US 2005/0093276 A1 May 5, 2005

(51) Int. Cl.$^7$ ................................................. B60R 21/01
(52) U.S. Cl. ................ 280/735; 180/273; 177/210 EM; 324/207.2; 340/667
(58) Field of Search ........................ 280/735; 180/273; 340/667, 666; 177/210 EM, 136; 324/207.2; 335/205; 200/85 A

(56) References Cited

U.S. PATENT DOCUMENTS

| | | | | | |
|---|---|---|---|---|---|
| 3,829,803 | A | * | 8/1974 | Maeda | ........................ 335/205 |
| 5,959,557 | A | * | 9/1999 | Lim | ............................. 341/32 |
| 6,129,168 | A | | 10/2000 | Lotito et al. | ................ 180/273 |
| 6,796,192 | B2 | * | 9/2004 | Sullivan et al. | ........ 73/862.391 |
| 2003/0220766 | A1 | * | 11/2003 | Saunders et al. | ........... 702/173 |
| 2004/0262957 | A1 | * | 12/2004 | Young et al. | ............... 340/667 |

* cited by examiner

*Primary Examiner*—Peter C. English
(74) *Attorney, Agent, or Firm*—Harrington & Smith, LLP

(57) ABSTRACT

A Hall effect sensor assembly including a Hall effect sensor; an overmolded housing which is overmolded onto the Hall effect sensor; and a magnet movably connected to the Hall effect sensor by a movable connection with the overmolded housing. The movable connection restrains movement of the magnet to a path along and aligned with a Hall effect central sensing axis. The magnet is substantially prevented from tilting relative to the sensing axis.

25 Claims, 8 Drawing Sheets

HALL EFFECT SENSOR ASSEMBLY

BACKGROUND OF THE INVENTION

1. Field of the Invention

The present invention relates to a sensor assembly and, more particularly, to a sensor assembly which comprises a Hall effect sensor.

2. Brief Description of Prior Developments

U.S. Pat. No. 6,129,168 describes a weight sensor for a vehicular safety restraint system. The patent describes use of a magnet and a Hall effect sensor and describes maintaining a constant air gap between the magnet and the Hall effect sensor.

A known conventional weight sensor used under a vehicle seat comprises a flexible printed circuit (FPC) mat, a mat frame, lock rings that removably connect the mat frame to the FPC mat, a plurality of Hall effect sensors crimped to the FPC mat in the vicinity of the lock rings, and a magnet spring tower removably connected to the mat frame by the lock rings. A problem with this conventional design is that the Hall effect sensor and the magnet spring tower are both separately mated in the FPC mat frame. The design allows the magnet and the Hall effect sensor to move out of perpendicular alignment with one another. There is no assurance that the Hall effect sensor will remain parallel with the magnet. The Hall effect sensor reads the strength of the magnetic field of the magnet. If the two components get out of parallel by as little as 10 degrees, it will impact the way the Hall effect sensor reads the magnetic field. Another problem is that field repair is virtually impossible. The size and delicacy of the Hall effect sensor, and the complexity in assembling the conventional design make replacing a failed Hall effect sensor impractical by a vehicle dealership. Another problem is the large number of components needed to manufacture the conventional design which increases the manufacturing costs and assembly. There is a desire to provide a Hall effect sensor assembly which can overcome the problems noted above.

SUMMARY OF THE INVENTION

In accordance with one aspect of the present invention, a Hall effect sensor assembly is provided including a Hall effect sensor; an overmolded housing which is overmolded onto the Hall effect sensor; and a magnet movably connected to the Hall effect sensor by a movable connection with the overmolded housing. The movable connection restrains movement of the magnet to a path along and aligned with a Hall effect central sensing axis. The magnet is substantially prevented from tilting relative to the sensing axis.

In accordance with another aspect of the present invention, a Hall effect sensor assembly is provided comprising a housing, a Hall effect sensor, a permanent magnet and a spring. The housing comprises a first housing member and a second housing member. The second housing member is slideably connected to the first housing member along an axis. The Hall effect sensor is connected to the first member. The first housing member comprises an overmolded housing member which is overmolded on the Hall effect sensor. The permanent magnet is connected to the second housing member. The spring is connected between the first and second housing members to bias the permanent magnet and second housing member in a direction away from the Hall effect sensor. The Hall effect sensor comprises electrical leads with distal ends having the overmolded housing member thereon to fixedly connect the distal ends to the overmolded housing member. Exposed middle sections of the leads do not have the overmolded housing member thereon. The exposed middle sections are adapted to be connected to connection terminals, and the overmolded housing member retain the exposed middle sections in a fixed orientation relative to each other and relative to the overmolded housing member.

In accordance with one method of the present invention, a method of assembling a Hall effect sensor assembly is provided comprising steps of overmolding a first housing member onto a Hall effect sensor; and movably connecting a permanent magnet to the first housing member by a movable connection. The movable connection comprises a spring biasing the permanent magnet away from the Hall effect sensor. The movable connection limits movement of the permanent magnet to a fixed orientation relative to the Hall effect sensor along a Hall effect central sensing axis. The permanent magnet is substantially prevented from tilting relative to the Hall effect central sensing axis.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
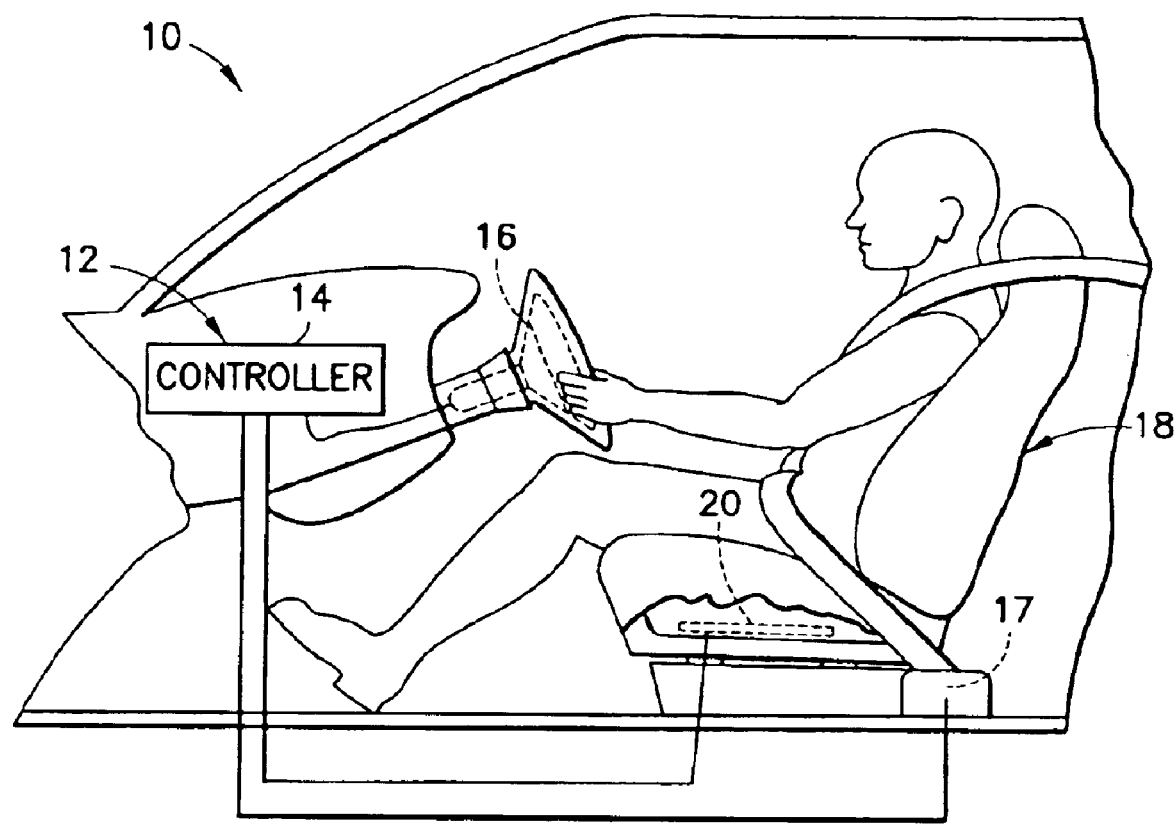
FIG. 1 is a diagrammatic view of a portion of a vehicle having a safety restraint system incorporating features of the present invention.

Referring to FIG. 1, there is shown a diagrammatic view of a portion of a vehicle 10 having a safety restraint system 12 incorporating features of the present invention. Although the present invention will be described with reference to the exemplary embodiment shown in the drawings, it should be understood that the present invention can be embodied in many alternate forms of embodiments. In addition, any suitable size, shape or type of elements or materials could be used.

A similar safety restraint system is described in U.S. Pat. No. 6,129,168 which is hereby incorporated by reference in its entirety. The safety restraint system 12 generally comprises a controller 14, airbags 16, 17, and a seat sensor device 20 located in a seat 18. In the embodiment shown, the air bag 16 is a steering wheel mounted air bag. The air bag 17 is a seat belt mounted air bag. The controller 14 can be connected to other air bags in the vehicle 10, such as a passenger side dashboard mounted air bag and side mounted air bags, for example. The controller 14 is connected to the air bags 16, 17 to control their deployment. The controller 14 is also connected to various sensors located about the vehicle as is generally known in the art.

One of the sensors connected to the controller 14 is the seat sensor device 20 located in the seat 18. In the embodiment shown, the seat sensor device 20 is shown in the driver's seat. One or more additional seat sensor devices could be located in one or more of the passenger seats. The seat sensor device 20 is adapted to determine the size and position of a person sitting in the seat. The information sensed by the seat sensor device 20 is transmitted back to the controller 14 to allow the controller to determine if and/or at what force the air bags 16, 17 should be deployed in the event of an accident.

Figure 3:
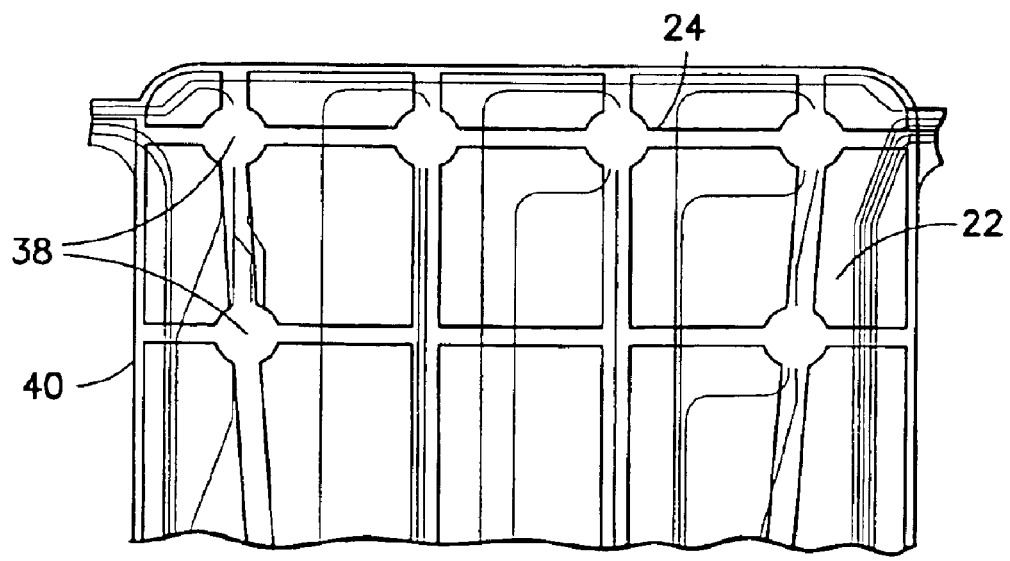
FIG. 3 is a bottom plan view of a portion of the seat sensor device shown in FIG. 2.
Figure 2:
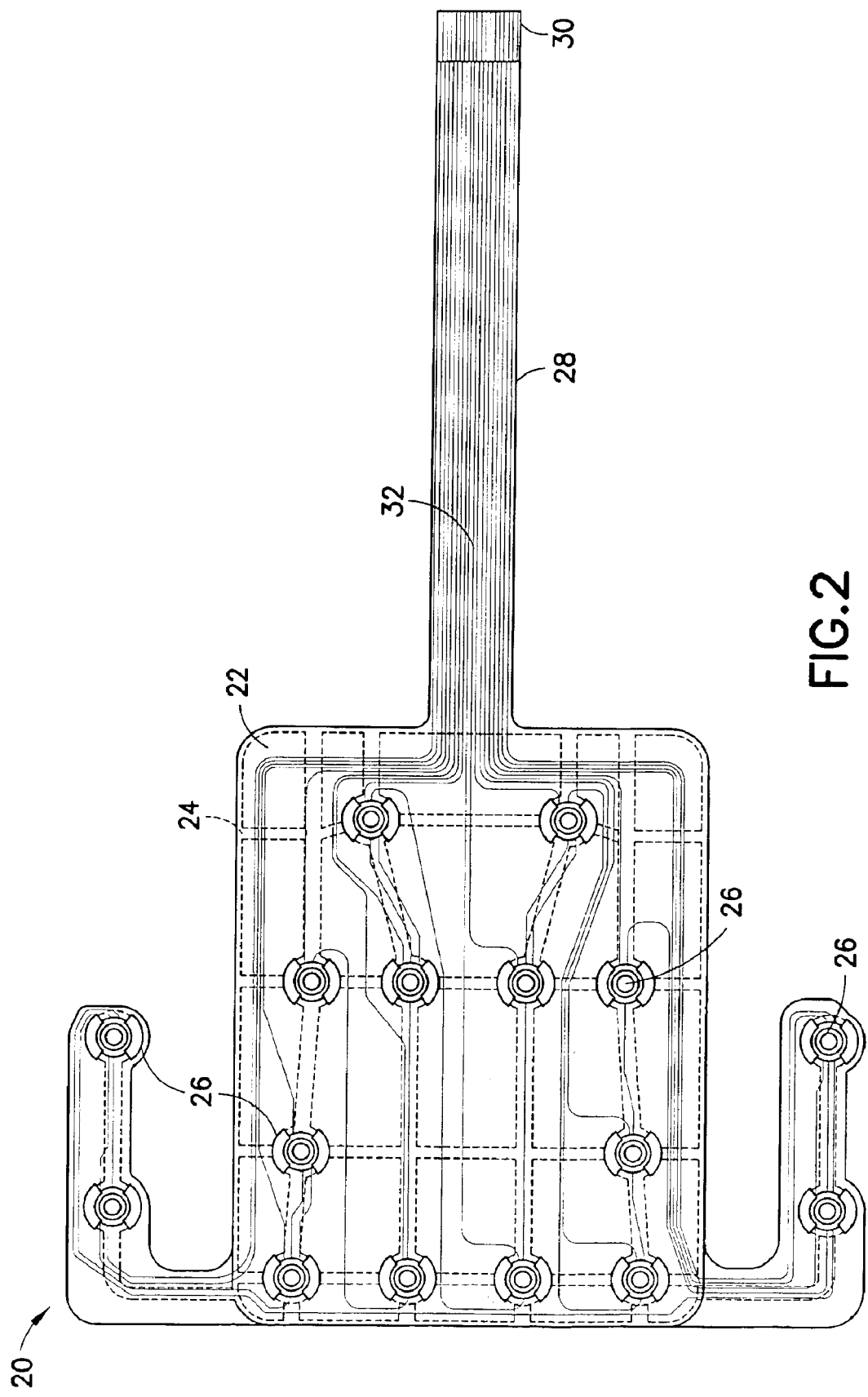
FIG. 2 is a top plan view of a seat sensor device used in the vehicle safety restraint system shown in FIG. 1.
Figure 4:
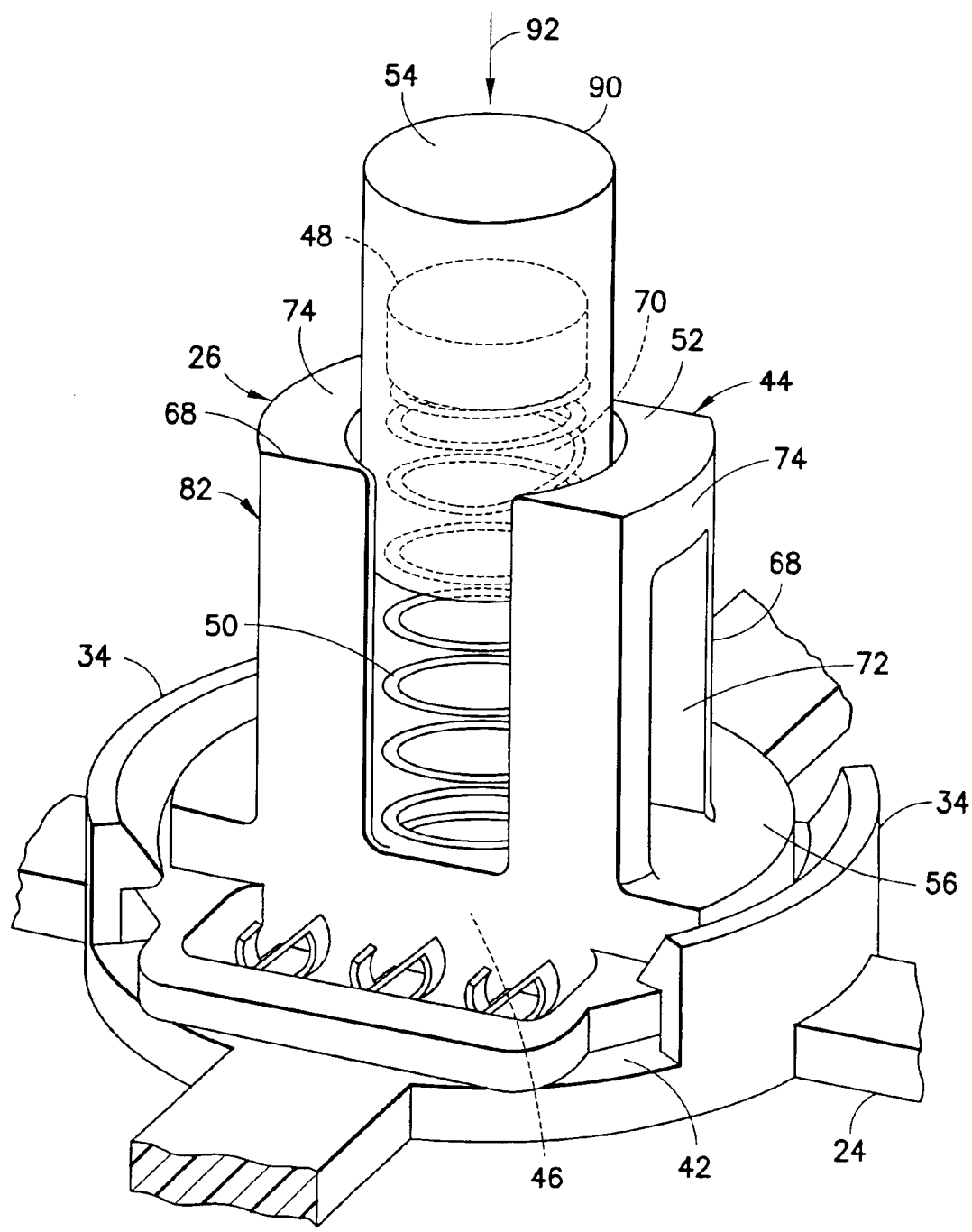
FIG. 4 is an enlarged perspective view of a portion of the seat sensor device shown in FIG. 2, but without showing the flexible printed circuit may merely for the sake of clarity.
Figure 5:
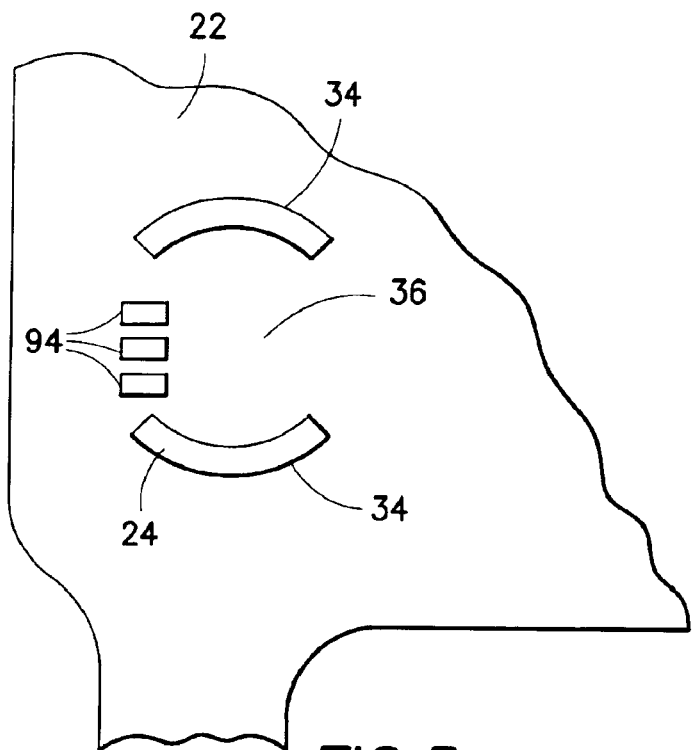
FIG. 5 is a partial top plan view of a portion of the flexible printed circuit mat, the frame, and three terminals prior to connection of a Hall effect sensor assembly.
Figure 6:
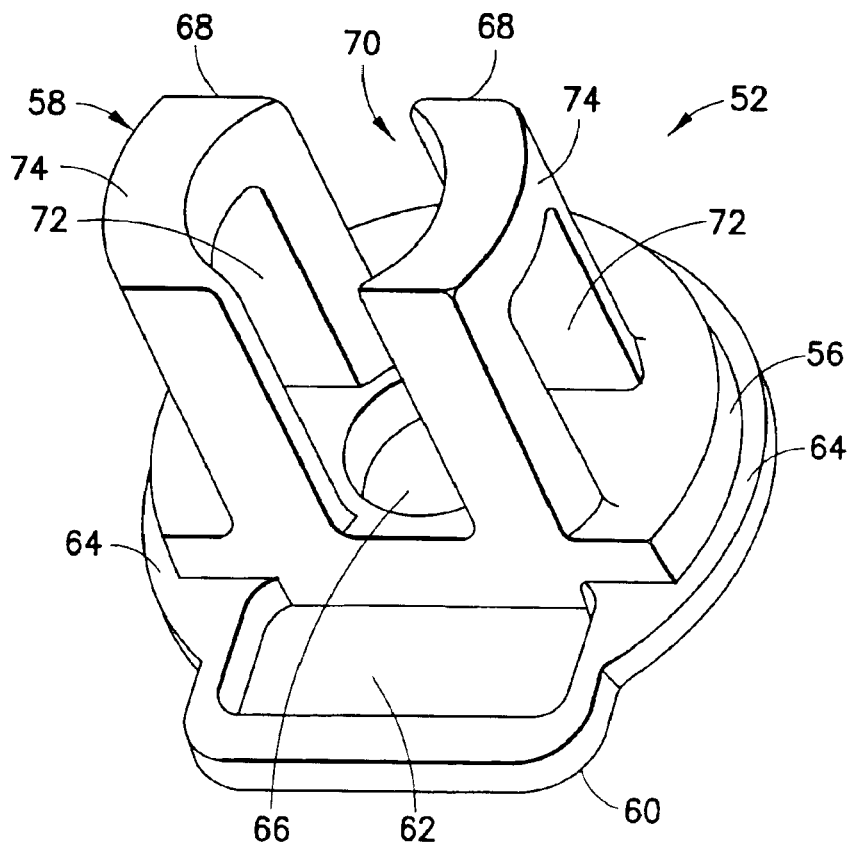
FIG. 6 is a perspective view of a first housing member of the sensor assembly shown in FIG. 4.

Referring now also to FIGS. 2–4, the seat sensor device 20 generally comprises a flexible printed circuit (FPC) 22, a frame 24, and a plurality of Hall effect sensor assemblies 26. As seen best in FIG. 2, the flexible printed circuit 22 is provided in the general shape of a mat. The FPC mat 22 has a connection tail 28 with contact sections 30. Electrical conductors 32 extend through the FPC mat 22 and are covered by electrical insulation. The frame 24 is generally comprised of molded plastic. The frame 24 provides a support for the FPC mat 22. The frame 24 is located against a bottom side of the FPC mat 22. As shown in FIG. 5, the frame 24 comprises pairs of snap lock latches 34 which extend through holes in the FPC mat 22 such that the snap lock latches are located on the top side of the FPC mat. Each of the opposing pairs of snap lock latches 34 form a receiving area 36 therebetween on the top side of the FPC mat 22. As shown best in FIG. 3, the frame 24 comprises support sections 38 connected to each other by a support lattice section 40. The support sections 38 comprise a general flat disk shape. The snap lock latches 34 extend from a top side of the support sections 38. Thus, the support sections 38 provide a substantially flat surface 42 on the top side of the frame 24 between each of the pairs of snap lock latches 34.

Referring now particularly to FIG. 4, a portion of the frame 24 is shown with one of the Hall effect sensor assemblies 26 attached thereto. FIG. 4 shows the seat sensor device without showing the FPC mat 22 merely for the sake of clarity. The FPC mat 22 would be located between the flat surface 42 and the bottom side of the Hall effect sensor assembly 26. The FPC mat is essentially sandwiched between the bottom side of the sensor assembly 26 and the flat surface 42. The Hall effect sensor assembly 26 generally comprises a housing 44, a Hall effect sensor 46, a magnet 48, and a spring 50. In the embodiment shown, the seat sensor device 20 comprises sixteen of the Hall effect sensor assemblies 26 (see FIG. 2). However, in alternate embodiments, the seat sensor device could comprise more or less than sixteen Hall effect sensor assemblies. In addition, the Hall effect sensor assemblies could be positioned in any suitable type of array on the FPC mat 22.

Referring also to FIGS. 6–10, the housing 44 generally comprises a first housing member 52 and a second housing member 54. The first housing member 52 is preferably comprised of molded plastic or polymer material. As seen best in FIGS. 6 and 7, the first housing member 52 generally comprises a base section 56 and a general tube section 58. The base section 56 generally comprises an extension 60 having an open aperture 62, snap lock ledges 64, and a central spring cavity 66. The general tube section 58 extends in an upward direction from the top side of the base section 56 around the spring cavity 66. The general tube section 58 generally comprises two opposing curved columns 68. The two columns 68 defined a magnet movement path therebetween. More specifically, the two columns 68 define an area 70 which is adapted to receive the second housing member 54 which houses the magnet as further described below. In the embodiment shown, each of the columns 68 include an alignment slot 72 therein. The alignment slots 72 are used to movably attach the second housing member 54 to the first housing member 52 as further described below. The top sides of the alignment slots 72 are closed by transverse sections 74 of the columns.

Figure 7:
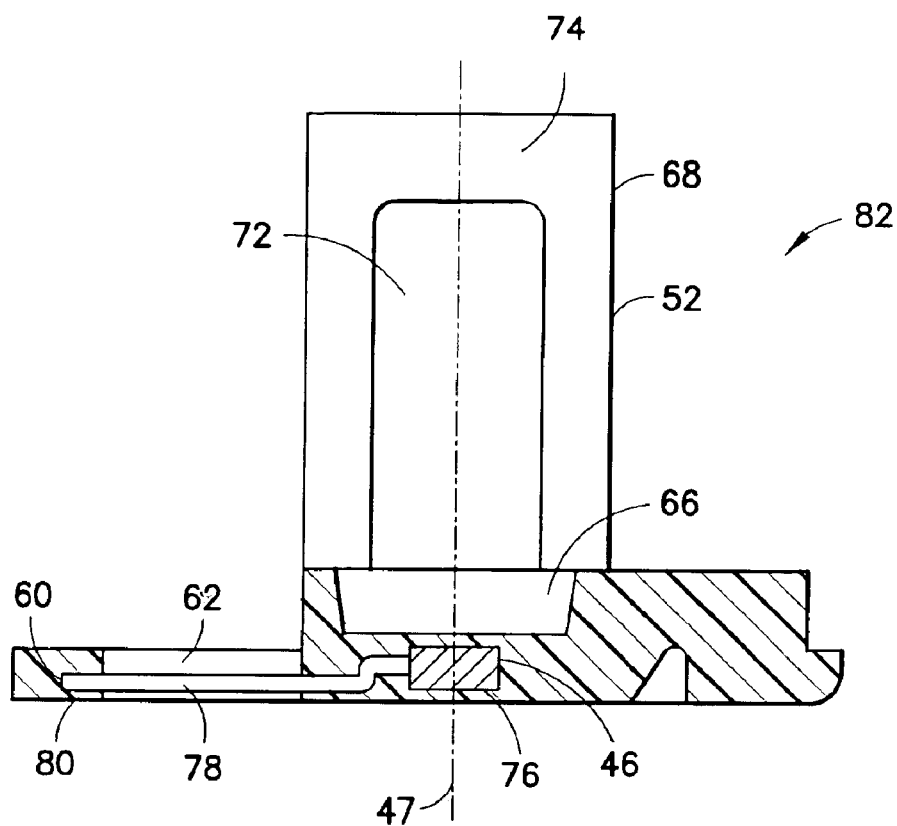
FIG. 7 is a cross sectional view of a first subassembly of the sensor assembly shown in FIG. 4 comprising the first housing member shown in FIG. 6 and a Hall effect sensor.
Figure 8:
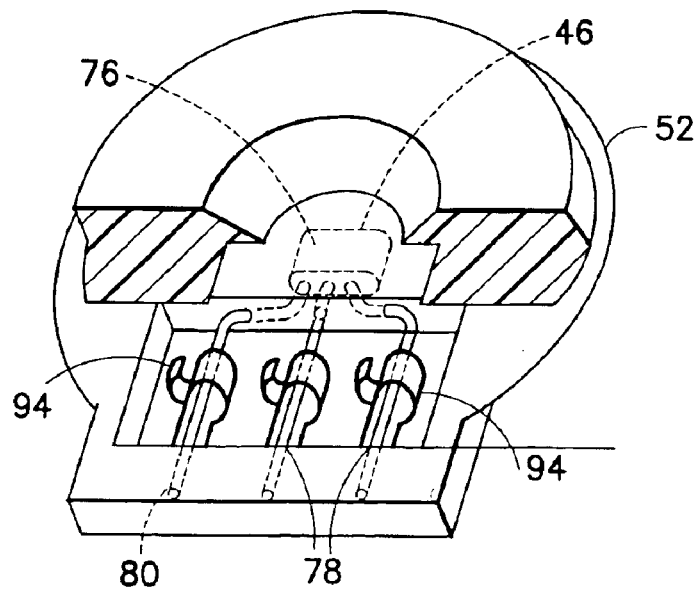
FIG. 8 is a perspective view of the first subassembly shown in FIG. 7 with a cutaway section.

Referring particularly to FIGS. 7 and 8, the Hall effect sensor 46 is housed, at least partially, inside the first housing member 52. Thus, the first housing member 52 and the Hall effect sensor 46 form a first subassembly 82. In a preferred embodiment of the present invention, the first housing member 52 comprises an overmolded housing which is overmolded over portions of the Hall effect sensor 46. The Hall effect sensor 46 generally comprises a sensing section 76 and three electrical leads 78. One lead is for power, one lead is for ground and one lead is for signals. In a preferred embodiment, the Hall effect sensor 46 is a range taking sensor capable of continuous signaling of distance of the magnet relative to the sensor 46. However, in alternate embodiments, the Hall effect sensor could be adapted to signal two or more range settings, such as by using a step capable sensor.

The three electrical leads 78 span across the open aperture 62 of the extension 60 in the first housing member 52 and, more specifically, the electrical leads 78 comprises exposed middle sections which do not have the overmolded housing member 52 thereon. The electrical leads 78 comprises distal ends 80 which are fixedly attached to the first housing member 52 by the overmolding process. The proximal end of the electrical leads 78 are also fixedly attached to the first housing member by the overmolding process. Thus, the first housing member 52 retains the exposed middle sections of the electrical leads in a fixed, spaced orientation relative to each other and a fixed orientation relative to the overmolded housing member 52.

Figure 9:
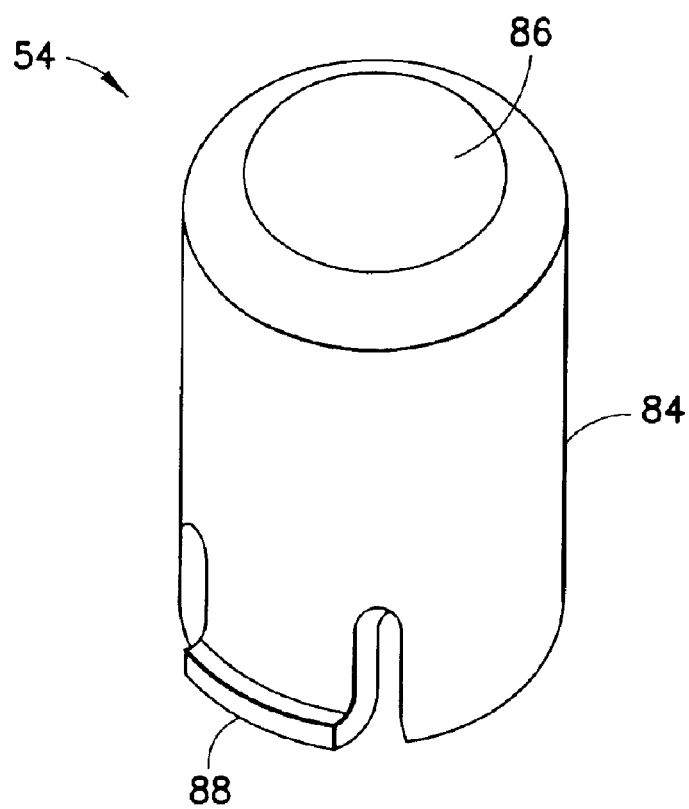
FIG. 9 is a perspective view of a second housing member used in the sensor assembly shown in FIG. 4.
Figure 10:
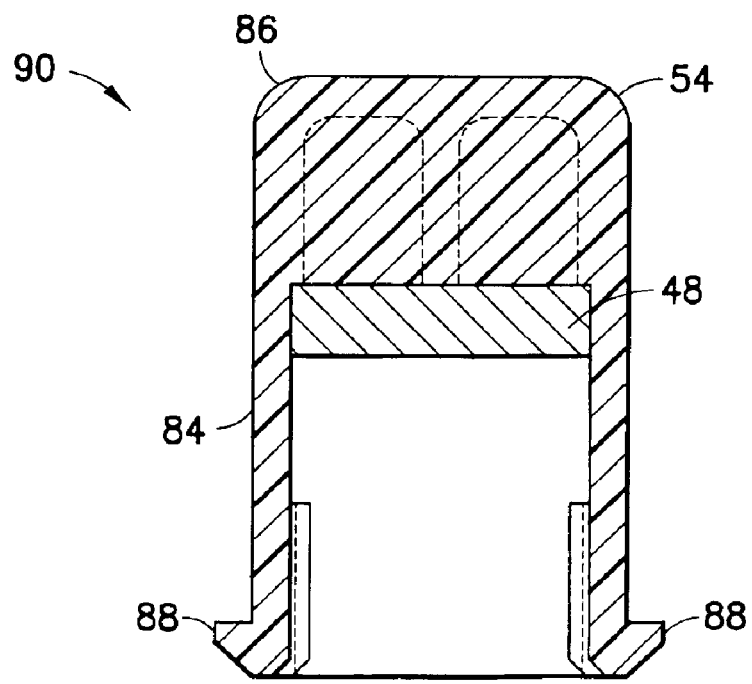
FIG. 10 is a cross sectional view of a second subassembly used in the sensor assembly shown in FIG. 4 comprising the second housing member shown in FIG. 9 and a permanent magnet.

Referring particularly to FIGS. 9 and 10, the second housing member 54 generally comprises a one-piece member preferably comprised of molded plastic or polymer material. The second housing member 54 generally comprises a tube shaped section 84, a top section 86 and snap lock latches 88 forming a bottom part of the tube shaped section 84. The magnet 48 is located inside the tube shaped section 84 against the bottom side of the top section 86. The magnet 84 is preferably press fit inserted into the second housing member. Thus, the second housing member 54 and magnet 48 form a second subassembly 90.

As seen in FIG. 4, the spring 50 is connected between the two subassemblies 82, 90. A first end of the spring 50 is located in the spring cavity 66 of the first housing member 52 (see FIG. 6) and a second opposite end of the spring is located inside the tube shaped section 84 of the second housing member 54. The second opposite end of the spring 50 is located directly against the bottom side of the magnet 48. The spring 50 biases the second subassembly 90 in an upward direction as shown in FIG. 4. In a preferred embodiment the spring is comprised of nonferrous material such that it does not impact the magnetic field.

In order to assemble the two subassemblies 82, 90 and spring 50 together, the spring is placed in the spring cavity 66 and the second subassembly 90 is inserted into the top of the first subassembly 82 as indicated by arrow 92 with the bottom of the second housing 54 entering into the area 70 between the two columns 68. The area 70 is sized and shaped to slidably received the second housing member 54 therein. As the second housing member 54 is inserted into the area 70, the snap lock latches 88 are resiliently deflected in an inward direction until the latches pass by the transverse sections 74 of the columns 68. The snap lock latches 88 are then able to deflect outward and into the two alignment slots 72. This provides a snap lock connection of the second housing member 54 to the first housing member 52.

Figure 11:
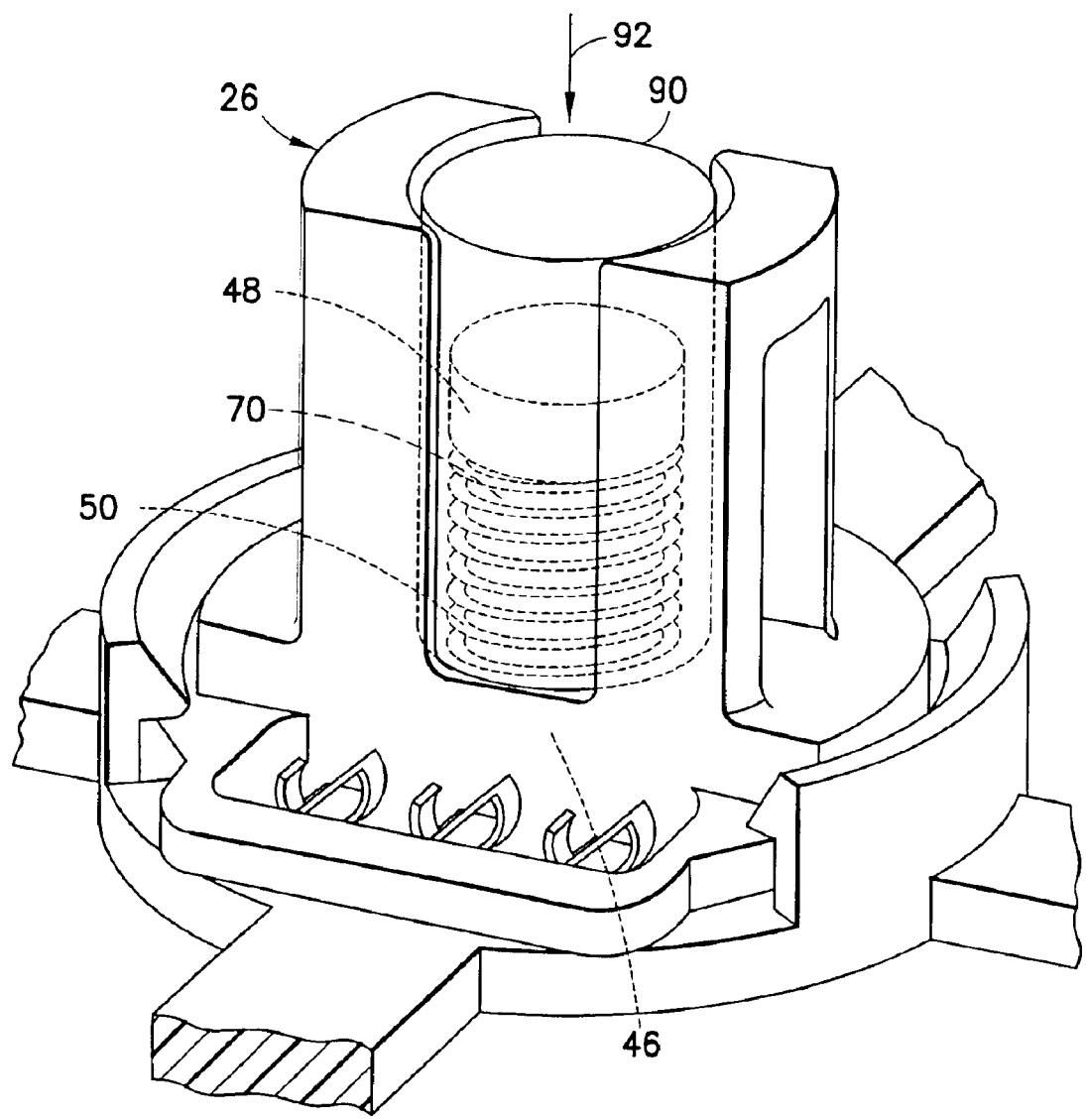
FIG. 11 is a perspective view as in FIG. 4 with the second subassembly moved towards a depressed position.

The snap lock connection merely prevents the second subassembly 90 from becoming disengaged from the first subassembly 82. However, the connection of the two subassemblies 82, 90 to each other provides a movable connection. More specifically, the outer portions of the snap lock latches 88 are adapted to vertically slide in the alignment slots 72. Referring also to FIG. 11, the Hall effect sensor assembly 26 is shown similar to that shown in FIG. 4, but in this configuration the second subassembly 90 has been depressed as indicated by arrow 92 in an inward direction; further into the area 70. This results in the spring 50 being resiliently compressed and the magnet 48 being moved closer to the Hall effect sensor 46. When force is reduced on the top surface of the second subassembly 90, the spring 50 can move the second subassembly and the magnet 48 in a direction away from the Hall effect sensor 46. With the present invention, the movably connection between the two housing members 52, 54 provides a telescoping type of movement which allows the magnet to move towards and away from the Hall effect sensor 46 along a Hall effect central sensing axis 47 (see FIG. 7). The movable connection is designed to prevent the magnet 48 from getting out of parallel with the Hall effect sensor 46 by more than ten degrees. In a preferred embodiment, the magnet might only be able to tilt or move out of alignment by 5–10 degrees.

Figure 12:
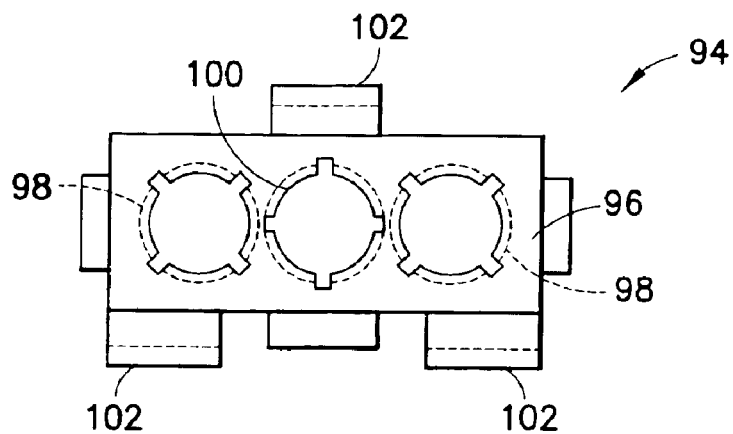
FIG. 12 is a top plan view of one of the terminals used to connect the sensor assembly shown in FIG. 4 to the flexible printed circuit mat.
Figure 13:
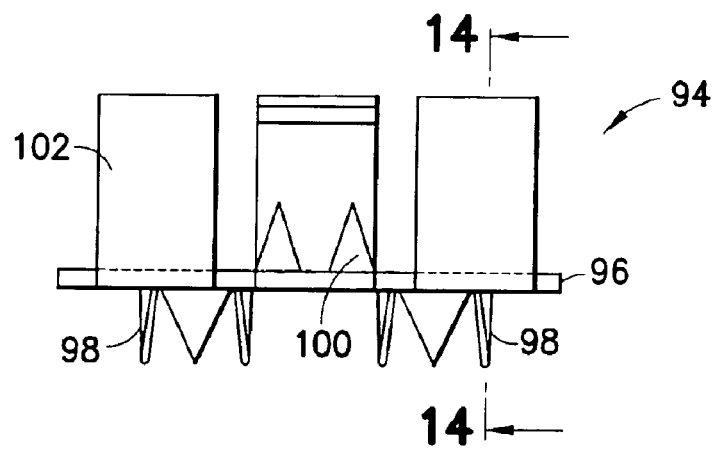
FIG. 13 is a side elevational view of the terminal shown in FIG. 12.
Figure 14:
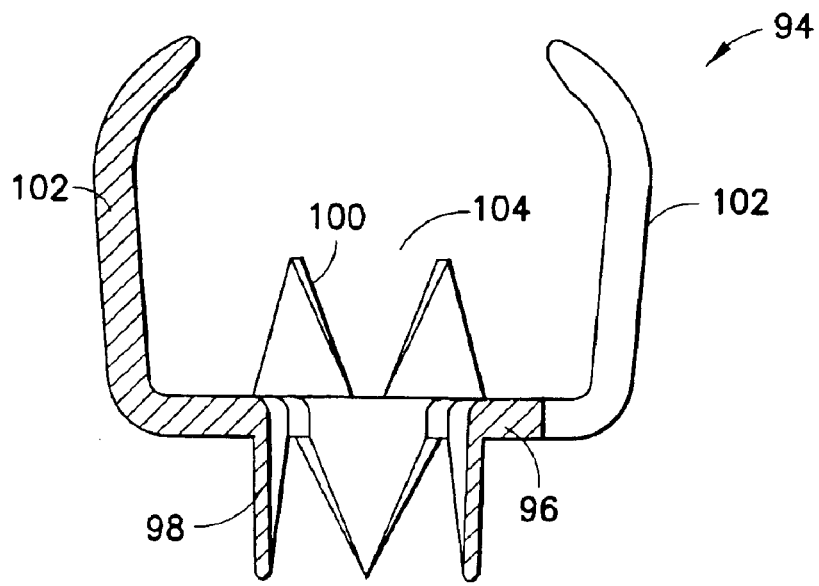
FIG. 14 is a cross sectional view of the terminal shown in FIG. 13 taken along line 13—13.

As seen best in FIGS. 5 and 8, the seat sensor device 20 includes electrical terminals 94. More specifically, in the embodiment shown, three of the terminals 94 are provided at each of the sensor assemblies 26; one terminal for each one of the electrical leads 78 of the Hall effect sensor 46. Referring also to FIGS. 12–14, one of the terminals 94 is shown. Each terminal 94 generally comprises a one-piece electrically conductive member. In a preferred embodiment, the terminal 94 is comprised of flat sheet metal which has been stamped into the shape shown. The terminal 94 generally comprises a center section 96, bottom extending sections 98, a top extending section 100, and upward extending side sections 102.

The terminals 94 are fixedly attached to the FPC mat 22 before the sensor assemblies 26 are connected. More specifically, the terminals 94 are pressed against the top surface of the FPC mat 22 with the bottom extending sections 98 piercing through the mat and being deformed outward and upward to form a mechanical and electrical connection with individual ones of the electrical conductors 32 in the mat. When the sensor assemblies 26 are being connected to the FPC mat 22 and the snap lock latches 34 of the frame 24, the terminals 94 are received in the open aperture 62 of the extension 60 through the bottom of the first housing member 52. The electrical leads 78 of the Hall effect sensors 46 are each positioned into the area 104 between the side sections 102 of one of the terminals.

The side sections 102 are then deformed inward towards the area 104 to clamp the middle exposed sections of the electrical leads 78 into a mechanical and electrical connection with the top extending section 100 and side sections 102 against the top side of the center section 96. If the electrical leads 78 comprise electrical insulation, the relatively sharp edges on the top extending section 100 is adapted to cut through the electrical insulation to insurer electrical contact between the terminal 94 and the electrical conductor of the electrical lead 78. However, in alternate embodiments, any suitable type of terminal or method of electrically connecting the electrical leads 78 to the electrical conductors 32 of the FPC mat 22 could be provided. However, in the embodiment shown, the terminals 94 are adapted to allow the side sections 102 to be moved to an open position again to allow the sensor assembly 26 to be removed from connection with the terminals. A replacement sensor assembly can be connected to the FPC mat to replace a broken or faulty original sensor assembly 26. Thus, in a preferred embodiment, the electrical connection of the sensor assembly 26 to the conductors in the FPC mat is preferably a removable connection. In an alternate embodiment, the electrical connection might not comprise a removable connection.

Referring back to FIG. 4, the sensor assembly 26 is attached to the frame 24 by inserting the base section 56 through the top side of an opposing pair of the snap lock latches 34. The snap lock ledges 64 (see FIG. 6) of the first housing member 52 snap beneath portions of the snap lock latches 34. The present invention, unlike conventional designs, does not need a separate lock to attach the frame to the FPC mat. With the present invention, the first housing member 52 functions as the lock to attach the FPC mat to the frame 24. The use of the first housing member 52 as the lock allows the seat sensor device 20 to be manufactured with less components. The assembly of the seat sensor device 20 comprises less steps and is therefore quicker to assemble.

The present invention is for a Hall effect sensor assembly aimed primarily at overcoming alignment and repair issues which exist in conventional designs. In a preferred embodiment, the sensor assembly is for use in a vehicle seat assembly and comprises an array of Hall effect sensors which determine the size and position of a person sitting in the seat of the vehicle. A purpose of the assembly is to determine if, and at what force, an air bag should be deployed in an accident. As noted above, in conventional designs there are no assurances that a Hall effect sensor will remain parallel with the actuating magnet. The Hall effect sensor reads the strength of the magnetic field of the magnet. If the two components get out of parallel by as little as 10 degrees, it will impact the way the Hall effect sensor reads the magnetic field of the magnet. With the present invention, the two components are prevented from getting out of parallel by more than 10 degrees. Field repair is also virtually impossible with a conventional sensor assembly. The size and delicacy of the Hall effect sensor, and the complexity of assembling the current conventional design array, make replacing a failed Hall effect sensor impractical by a vehicle dealership. Field repair is now possible and practical with the present invention. The large number of components in a conventional assembly also increases the manufacturing costs and assembly time. The present invention reduces the number of components and provide the component is easier to handle subassemblies.

The present invention can use overmolding of a housing member onto the Hall effect sensor to protect the Hall effect sensor from damaged during assembly. With the present invention, the magnet and the Hall effect sensor are held in parallel at all times. The present invention can retain the magnet and the Hall effect sensor in alignment along a common or normal axis 47 because the Hall effect sensor is molded into a base of the magnet-spring tower. The design allows the Hall effect sensor, along with the entire magnet-spring tower, to be changed relatively quickly. The magnet and Hall effect sensor are contained in one subassembly; the sensor assembly 26. Thus, field repair is now possible and practical. The present invention also allows the use of a fewer number of components than the conventional design. The present invention also provides a fewer number of assembly steps.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A Hall effect sensor assembly comprising:
   a Hall effect sensor;
   an overmolded housing which is overmolded onto the Hall effect sensor; and
   a magnet movably connected to the Hall effect sensor by a movable connection with the overmolded housing, wherein the movable connection restrains movement of the magnet to a path along and aligned with a Hall effect central sensing axis, and wherein the magnet is substantially prevented from tilting relative to the sensing axis,
   wherein the Hall effect sensor and the overmolded housing are adapted to be connected as a single subassembly to a flexible printed circuit at a substantially same time.

2. A Hall effect sensor assembly as in claim 1 wherein the overmolded housing comprises a general tube section located above the Hall effect sensor.

3. A Hall effect sensor assembly as in claim 1 wherein the overmolded housing comprises an open section, and wherein electrical leads of the Hall effect sensor span across the open section.

4. A Hall effect sensor assembly as in claim 3 wherein the overmolded housing comprises a base section adapted to be snap lock connected to a mounting frame.

5. A Hall effect sensor assembly as in claim 1 wherein the Hall effect sensor and overmolded housing are adapted to be removably connected as the single subassembly to the flexible printed circuit by at least one removable connection.

6. A Hall effect sensor assembly comprising:
   a Hall effect sensor;
   an overmolded housing which is overmolded onto the Hall effect sensor; and
   a magnet movably connected to the Hall effect sensor by a movable connection with the overmolded housing, wherein the movable connection restrains movement of the magnet to a path along and aligned with a Hall effect central sensing axis, and wherein the magnet is substantially prevented from tilting relative to the sensing axis,
   wherein the overmolded housing comprises a general tube section located above the Hall effect sensor, and
   wherein the general tube section of the overmolded housing comprises two opposing curved columns defining a magnet movement path therebetween, and wherein the opposing columns each comprise an alignment slot therein.

7. A vehicle seat sensor device comprising:
   a frame;
   a flexible printed circuit mat connected to the frame; and
   a Hall effect sensor assembly as in claim 1. electrically connected to the flexible printed circuit mat and mechanically connected to the frame.

8. A vehicle seat sensor device as in claim 7 wherein the Hall effect sensor assembly is snap lock connected to the frame.

9. A vehicle seat sensor device as in claim 7 further comprising a plurality of terminals connecting electrical leads of the Hall effect sensor to electrical conductors in the flexible printed circuit mat, wherein the terminals each comprise a first connection section extending from a first side of the terminal piercing through the flexible printed circuit mat and making electrical connection with one of the electrical conductors and a second connection section extending from an opposite second side of the terminal wrapped around a portion of one of the electrical leads.

10. A vehicle air bag system comprising:
    an air bag;
    a controller connected to the air bag for activating the air bag; and
    a vehicle seat sensor device as in claim 7, wherein conductors of the flexible printed circuit mat are coupled to the controller.

11. A Hall effect sensor assembly comprising:
    a Hall effect sensor;
    an overmolded housing which is overmolded onto the Hall effect sensor; and
    a magnet movably connected to the Hall effect sensor by a movable connection with the overmolded housing, wherein the movable connection restrains movement of the magnet to a path along and aligned with a Hall effect central sensing axis, and wherein the magnet is substantially prevented from tilting relative to the sensing axis,
    wherein the overmolded housing comprises a general tube section located above the Hall effect sensor, and
    wherein the overmolded housing forms a first housing member, and the Hall effect sensor assembly further comprising a second housing member, wherein the magnet is fixedly connected to the second housing member, and wherein the second housing member is movably located in the general tube section of the overmolded housing.

12. A Hall effect sensor assembly as in claim 11 wherein the second housing member comprises a tube shaped section, wherein the tube shaped section is slidably mounted in the general tube section of the overmolded housing, and wherein interference between the tube shaped section and the general tube section provides a telescoping movement substantially preventing the second housing member from tilting relative to the overmolded housing.

13. A Hall effect sensor assembly as in claim 11 wherein the second housing member is snap lock connected to the overmolded housing.

14. A Hall effect sensor assembly as in claim 13 wherein the general tube section comprises guide slots, and wherein snap lock sections of the second housing member are movably located in the guide slots.

15. A Hall effect sensor assembly comprising:
a Hall effect sensor;
an overmolded housing which is overmolded onto the Hall effect sensor; and
a magnet movably connected to the Hall effect sensor by a movable connection with the overmolded housing, wherein the movable connection restrains movement of the magnet to a path along and aligned with a Hall effect central sensing axis, and wherein the magnet is substantially prevented from tilting relative to the sensing axis,
wherein the overmolded housing comprises a general tube section located above the Hall effect sensor, and
wherein the Hall effect sensor comprises leads with distal ends having the overmolded housing thereon to fixedly connect the distal ends to the overmolded housing, wherein exposed middle sections of the leads do not have the overmolded housing thereon, wherein the exposed middle sections are adapted to be connected to connection terminals, and wherein the overmolded housing retains the exposed middle sections in a fixed orientation relative to each other and relative to the overmolded housing.

16. A Hall effect sensor assembly comprising:
a housing comprising a first housing member and a second housing member, wherein the second housing member is slideably connected to the first housing member along an axis;
a Hall effect sensor connected to the first member, wherein the first housing member comprises an overmolded housing member which is overmolded on the Hall effect sensor;
a permanent magnet connected to the second housing member; and
a spring connected between the first and second housing members to bias the permanent magnet and second housing member in a direction away from the Hall effect sensor,
wherein the Hall effect sensor comprises electrical leads with distal ends having the overmolded housing member thereon to fixedly connect the distal ends to the overmolded housing member, wherein exposed middle sections of the leads do not have the overmolded housing member thereon, wherein the exposed middle sections are adapted to be connected to connection terminals, and wherein the overmolded housing member retains the exposed middle sections in a fixed orientation relative to each other and relative to the overmolded housing member.

17. A Hall effect sensor assembly as in claim 16 wherein the second housing member is slidably connected to the first housing member by a movable connection, wherein the movable connection restrains movement of the second housing member and the permanent magnet to a path along and aligned with a Hall effect central sensing axis, and wherein the permanent magnet is substantially prevented from tilting relative to the Hall effect central sensing axis.

18. A Hall effect sensor assembly as in claim 16 wherein the overmolded housing member comprises a general tube section located above the Hall effect sensor.

19. A Hall effect sensor assembly as in claim 18 wherein the general tube section of the overmolded housing member comprises two opposing curved columns defining a magnet movement path therebetween, and wherein the opposing columns each comprise an alignment slot therein.

20. A Hall effect sensor assembly as in claim 18 wherein the second housing member is movably located in the general tube section of the overmolded housing.

21. A Hall effect sensor assembly as in claim 20 wherein the second housing member comprises a tube shaped section, wherein the tube shaped section is slidably mounted in the general tube section of the overmolded housing member, and wherein interference between the tube shaped section and the general tube section substantially prevent the second housing member from tilting relative to the overmolded housing member.

22. A method of assembling a Hall effect sensor assembly with a flexible printed circuit comprising steps of:
overmolding a first housing member onto a Hall effect sensor; and
movably connecting a permanent magnet to the first housing member by a movable connection, wherein the movable connection comprises a spring biasing the permanent magnet away from the Hall effect sensor, wherein the movable connection limits movement of the permanent magnet to a fixed orientation relative to the Hall effect sensor along a Hall effect central sensing axis, and wherein the permanent magnet is substantially prevented from tilting relative to the Hall effect central sensing axis,
connecting the first housing member and the Hall effect sensor at a substantially same time as a single subassembly unit to the flexible printed circuit.

23. A method as in claim 22 wherein the step of connecting the first housing member and the Hall effect sensor as a single unit to the flexible printed circuit at a substantially same time comprises removably connecting the first housing member and the Hall effect sensor to the flexible printed circuit by at least one removable connection.

24. A method of assembling a Hall effect sensor assembly comprising steps of:
overmolding a first housing member onto a Hall effect sensor; and
movably connecting a permanent magnet to the first housing member by a movable connection, wherein the movable connection comprises a spring biasing the permanent magnet away from the Hall effect sensor, wherein the movable connection limits movement of the permanent magnet to a fixed orientation relative to the Hall effect sensor along a Hall effect central sensing axis, and wherein the permanent magnet is substantially prevented from tilting relative to the Hall effect central sensing axis,
wherein the step of overmolding the first housing member onto the Hall effect sensor comprises overmolding the first housing member onto distal ends of electrical leads of the Hall effect sensor and not overmolding the first housing member onto middle sections of the electrical leads.

25. A method as in claim 24 wherein the step of movably connecting the permanent magnet to the first housing member comprises connecting the permanent magnet to a second housing member, and snap lock connecting the second housing member to the first housing member, wherein the second housing member is slidably connected to the first housing member.

* * * * *